(12) United States Patent
Overley (10) Patent No.: US 9,694,926 B2
(45) Date of Patent: Jul. 4, 2017

(54) METHOD AND SYSTEM FOR CONVEYING ROLLED ABSORBENT PRODUCTS

(71) Applicant: The Procter & Gamble Company, Cincinnati, OH (US)

(72) Inventor: Matthew Bernard Overley, Deerfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/083,715

(22) Filed: Mar. 29, 2016

(65) Prior Publication Data

US 2016/0207653 A1   Jul. 21, 2016

Related U.S. Application Data

(63) Continuation of application No. 13/680,276, filed on Nov. 19, 2012, now abandoned.

(51) Int. Cl.
*B65G 47/52*     (2006.01)
*B65B 25/14*     (2006.01)
(Continued)

(52) U.S. Cl.
CPC ............ *B65B 25/146* (2013.01); *B65G 37/02* (2013.01); *B65G 47/52* (2013.01); *B65G 47/53* (2013.01); *B65G 47/684* (2013.01)

(58) Field of Classification Search
CPC ......... B65G 47/52; B65G 47/53; B65G 47/54
(Continued)

(56) References Cited

U.S. PATENT DOCUMENTS 3,805,954 A * 4/1974 Sutton ................... B65H 29/62
                                                                198/347.3
4,372,218 A * 2/1983 Ostlund .................. E01B 25/26
                                                                104/103
(Continued)

FOREIGN PATENT DOCUMENTS

EP     1 260 467 A1    11/2002
GB     2468855 A        9/2010

OTHER PUBLICATIONS

PCT International Search Report, mailed Feb. 6, 2014.
All Office Actions U.S. Appl. No. 11/192,012.

*Primary Examiner* — Leslie A Nicholson, III
*Assistant Examiner* — Lester Rushin
(74) *Attorney, Agent, or Firm* — Andrew J. Mueller (57) ABSTRACT

A conveying system for conveying rolled absorbent products. The system can include a first conveyor and a second conveyor for moving rolled absorbent products. The rolled absorbent products can be either partially wrapped or naked. The first and second conveyors can each have aligned centerlines parallel to a direction of movement. A first transfer device can be coupled to the first conveyor for diverting at least a portion of the partially wrapped rolled absorbent products in a direction substantially orthogonal to the centerline of the first conveyor to another conveyor for moving the diverted rolled absorbent products to a subsequent unit operation. The un-diverted portion of the conveyed rolled absorbent products can be conveyed to the second conveyor. In operation rolled absorbent products can be conveyed in a generally straight path from the first conveyor to the second conveyor, or in a path that diverts away from the first conveyor to the subsequent unit operation.

4 Claims, 9 Drawing Sheets

(51) Int. Cl.
 B65G 37/02 (2006.01)
 B65G 47/53 (2006.01)
 B65G 47/68 (2006.01)
(58) Field of Classification Search
 USPC ......... 198/370.01, 370.02, 370.07, 436, 440,
 198/448, 597, 598, 457.07
 See application file for complete search history.

(56) References Cited

U.S. PATENT DOCUMENTS

| | | | |
|---|---|---|---|
| 5,213,195 | A | 5/1993 | Sticht |
| 5,642,601 | A * | 7/1997 | Thompson, Jr. ........ B65B 63/02 428/921 |
| 6,484,886 | B1 | 11/2002 | Isaacs et al. |
| 2001/0048868 | A1 | 12/2001 | Schuitema et al. |
| 2003/0234155 | A1 | 12/2003 | Kanamori et al. |
| 2006/0070855 | A1 | 4/2006 | Lemm |
| 2008/0169171 | A1 | 7/2008 | Itoh et al. |
| 2012/0048678 | A1 | 3/2012 | Itoh et al. |

* cited by examiner

METHOD AND SYSTEM FOR CONVEYING ROLLED ABSORBENT PRODUCTS

FIELD OF THE INVENTION

The invention relates to the field of conveying rolled absorbent products. More particularly the invention relates to the field of conveying and optionally wrapping, and sealing, multiple rolls of absorbent products.

BACKGROUND OF THE INVENTION

Absorbent paper products find many uses in the home. For example absorbent paper products can be delivered on rolls, such as for bath tissue (e.g. toilet paper), and paper towels. Manufacturers often make and sell rolled paper products in packages containing multiple rolls. Such packages are usually sold in a form involving a plastic, sealed overwrap. The plastic sealed wrapping can seal a single roll of absorbent paper products, or it can seal multiple rolls of absorbent paper products.

The process of wrapping and sealing rolls of absorbent paper products often involves changing the direction of product flow of finished rolled absorbent products. For example one or more rolls of absorbent paper products can be wrapped by being enclosed in a tubular wrap of polymer film, which must be sealed at one or both ends of the package. Current sealing equipment is designed such that a wrapped roll of absorbent product (or multiple rolls of absorbent product) in which the wrapped rolls are oriented and conveyed in one direction must be transferred to move in a different direction, such as an orthogonal, direction to have the ends sealed.

The necessary diverting involved in transferring rolled absorbent paper products in a 90° angle conveying operation necessarily results in an "L-shaped" conveying path. The L-shaped conveying path has several disadvantages. First the L-shaped conveying path requires significant floor space. Second, the floor space is taken in two dimensions so to speak, such that an addition to a module at any portion of the conveyor requires the entire conveyor to change in two dimensions. Thirdly, when such an L-shaped configuration is utilized, the change in direction is necessary even for "naked" rolls, that is, rolls that are not being wrapped and sealed prior to being bundled or case packed, as is known in the art. Unwrapped, naked rolls can become unstable when conveyed in a transfer operation in which the direction of conveyance is changed.

Accordingly there is an unmet need for an improved conveying, wrapping, and sealing system for handling rolled absorbent products.

SUMMARY OF THE INVENTION

A conveying system for conveying rolled absorbent products is disclosed. In an embodiment, the system can include a first conveyor and a second conveyor for moving rolled absorbent products. The rolled absorbent products can be either partially wrapped or naked, the naked rolls being conveyed in streaming, side-by-side relationship. The first and second conveyors can each have a centerline parallel to a direction of movement, wherein each of the first and second conveyor centerlines are aligned. A first transfer device can be operatively coupled to the first conveyor, the first transfer device capable of diverting at least a portion of the partially wrapped rolled absorbent products in a direction substantially orthogonal to the centerline of the first conveyor to another conveyor for moving the diverted rolled absorbent products to a subsequent unit operation, such as package sealing. The un-diverted portion of the conveyed rolled absorbent products including at least a portion of the naked rolls can be conveyed to the second conveyor. In operation rolled absorbent products can be conveyed in a generally straight path from the first conveyor to the second conveyor, or in a path that diverts away from the first conveyor to the subsequent unit operation.

DETAILED DESCRIPTION OF THE INVENTION

The present invention is a method and system for conveying rolled absorbent products that optionally may be wrapped and sealed prior to being conveyed to a case packer for shipping to a retail customer. For example, a plurality of individual rolled absorbent products, such as toilet paper, or paper towels, can be conveyed "naked", that is in an unwrapped condition, to a case for packing and shipping. The case can be, for example, a cardboard box in which the plurality of naked rolls of rolled absorbent product are placed for shipping to a retail customer. In another example the individual rolled products can themselves be wrapped and sealed in a polymer film wrapping prior to being packed for shipping to a retail customer. Rolled absorbent products can be individually wrapped and sealed, or a plurality of rolled absorbent products can be wrapped and sealed inside a single wrapper prior to being packed for shipping to a retail customer. Such packs, for example two rolls of paper towels wrapped and sealed together in a polymer film wrapping, are well known in the art.

Figure 1:
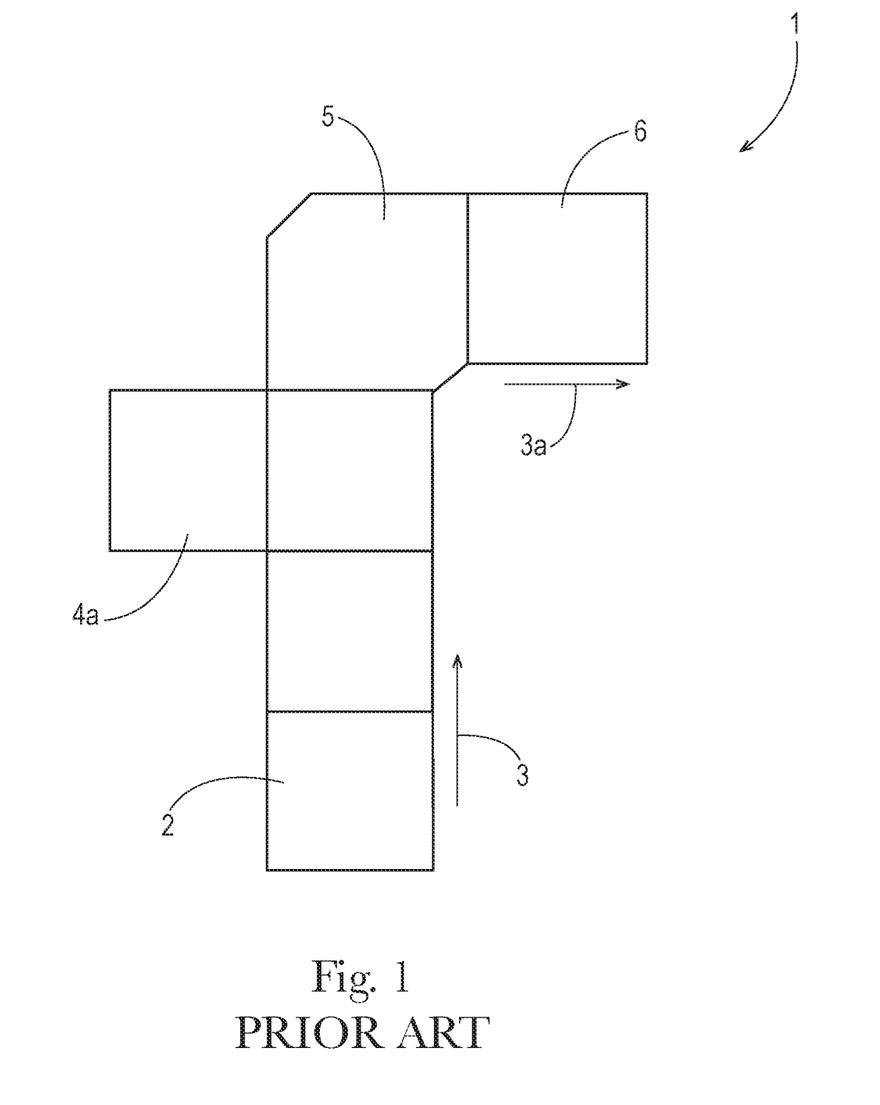
FIG. 1 is a plan schematic view of a prior art method and system for conveying absorbent rolled products.

In general, it is known in a conveying system for wrapping and sealing rolled absorbent products to divert one or more wrapped rolled absorbent products in a direction generally orthogonal to the direction being conveyed for wrapping, in order to seal the open ends of the wrapping. As shown in FIG. 1, for example, a typical wrapping and sealing operation 1 for rolled absorbent products involves an L-shaped layout of various conveyor components. Rolled product in the form of naked rolls can be conveyed on and in-feed conveyor system 2 in a direction shown by arrow 3 in FIG. 1 to a wrapping station 4. At wrapping station 4 one or more naked rolls can be wrapped, for example, in a lap sealed tubular polymer wrap which remains open at both ends, as is known in the art. To close and seal the open ends, the wrapped rolls of absorbent product change direction at a 90° transfer unit 5 in order to be conveyed to a sealing station 6 where the open ends of the polymer wrapping can be folded and sealed. This operation is typically referred to as an "end seal" operation, and is well known in the art.

As can be understood by referring to FIG. 1, a typical L-shaped layout with a traditional transfer unit can be difficult to integrate into buildings and factories. Because the conveying system extends significantly in two dimensions of floor space, the system tends to be effectively take up significant amounts of floor space. And any additions of components or unit operations into either leg of the L-shaped layout can cause the entire conveying system to necessarily be extended in two dimensions.

Figure 2:
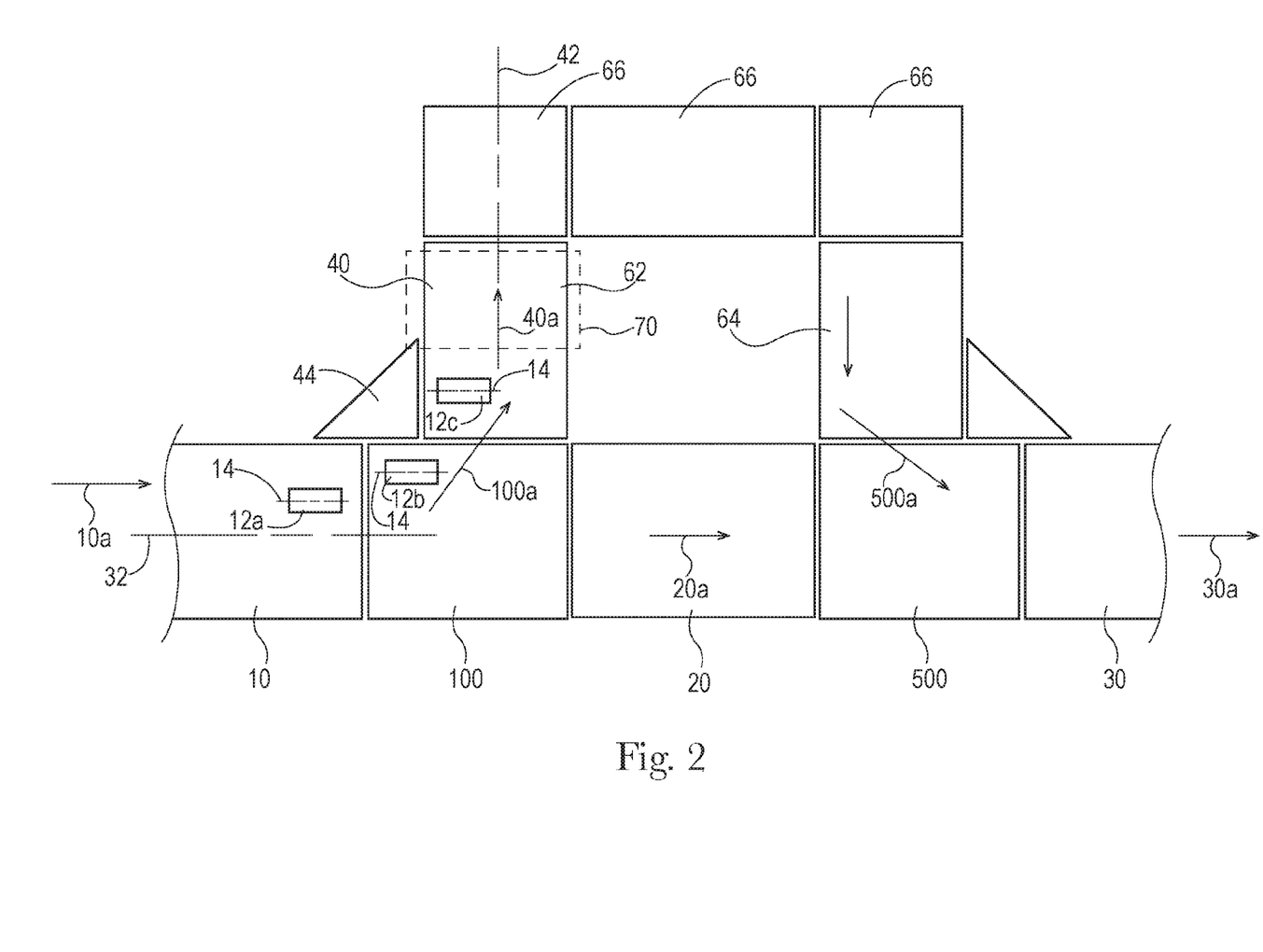
FIG. 2 is a plan schematic view of a method and system for conveying absorbent rolled products.

The present invention solves the drawbacks of prior art L-shaped layouts for wrapping and sealing rolled absorbent products, as well as introducing additional benefits related to handling of naked rolls. As shown in FIG. 2, for example, a schematic representation of an embodiment of a method and system of the present invention shows a system in which both naked rolls and wrapped products can be conveyed to packing equipment, but in which naked rolls need not be diverted, but can remain in a straight line path. The invention allows product to be conveyed in a path that remains substantially linear unless a subsequent packaging unit operation is necessary, such as a sealing operation, in which case rolls of absorbent product (which have been wrapped but not sealed, for example) can be diverted off the linear path, operated upon, such as being sealed, and then diverted again back on to the original linear path of the first, second, or third conveyors. In this manner, a conveying system can convey naked rolls in a linear path not involving a change of direction which can disrupt or destabilize one or more naked rolls. As discussed more fully below, in an embodiment, the present invention is a method and system in which products, such as rolled absorbent products, including naked rolls, can be conveyed on one or a series of conveyors, including a first conveyor 10, a second conveyor 20, and a third conveyor 30, the first, second, and third conveyors being aligned generally along a common centerline 32, with only certain rolled absorbent products being diverted off of and back on to the path of common centerline 32 via a fourth conveyor 40. In general, the first, second and third conveyors have respective centerlines, and the centerlines can be parallel. In addition, the respective centerlines can be aligned with one another, or any two can be aligned with each other. That is, therefore, first, second and third conveyors can be configured to have parallel centerlines such that the conveyors provide a straight path from the beginning of the first conveyor to the end of the third conveyor, but the centerlines need not be exactly aligned from one conveyor to another.

Figure 3:
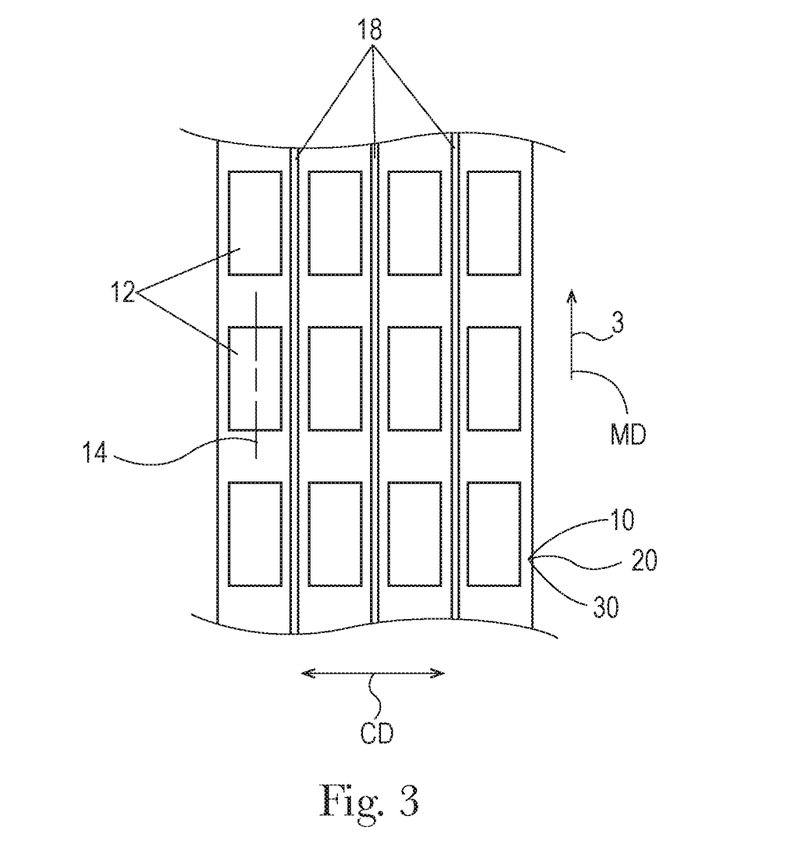
FIG. 3 is a plan view of a portion of the conveyor of the present invention.

Rolled absorbent products can be transferred in a manner to change the direction of conveyance by one or more transfer devices, including first transfer device 100 and second transfer device 500, indicated schematically in FIG. 2 at the end of first conveyor 10 and the beginning of third conveyor 30, respectively. Transfer device 100 serves to divert rolled absorbent product away from the substantially linear path of conveyance along centerline 32, and transfer device 500 serves to divert rolled absorbent product back to the substantially linear path of conveyance along centerline 32. In operation, typically only wrapped, rolled absorbent product in need of end sealing need be diverted off of first conveyor 10 onto fourth conveyor 40 for folding and sealing operations to complete sealing of sealed rolled absorbent products. First, second, third, and fourth conveyors can be any conveyors known in the art for transporting rolled products, including products such as rolls of paper towels and/or toilet paper. Rolled absorbent products can be conveyed in any manner known in the art, including upright in a generally vertically oriented position, or laying down generally flat on the conveyor. As shown in FIG. 3, for example, rolled absorbent products can be conveyed flat, that is laying down such that a cardboard tube core, if used, is generally parallel to a plane of a conveying surface. Rolled absorbent products can be conveyed in one or more streams of product flowing end to end, with the longitudinal axis 14 of each aligned generally parallel to a machine direction MD of conveyor flow. Longitudinal axis 14 of a rolled absorbent product can be, for example, coaxial with the center of a roll, which can be the center of a cardboard tube core.

In an embodiment, the invention is a conveying system for conveying rolled absorbent products, including a first conveyor and a second conveyor for moving rolled absorbent products. The rolled absorbent products can be either partially wrapped or naked, the naked rolls being conveyed in streaming, side-by-side relationship. The first and second conveyors can each have a centerline parallel to a direction of movement, wherein each of the first and second conveyor centerlines are aligned. A first transfer device can be operatively coupled to the first conveyor, the first transfer device capable of diverting at least a portion of the partially wrapped rolled absorbent products in a direction substantially orthogonal to the centerline of the first conveyor to another conveyor for moving the diverted rolled absorbent products to a subsequent unit operation, such as package sealing. The un-diverted portion of the conveyed rolled absorbent products including at least a portion of the naked rolls can be conveyed to the second conveyor. In operation rolled absorbent products can be conveyed in a generally straight path from the first conveyor to the second conveyor, or in a path that diverts away from the first conveyor to the subsequent unit operation.

In an embodiment, the invention is a conveying system for conveying rolled absorbent products, including a first conveyor, a second conveyor, and a third conveyor. The first, second, and third conveyors can each have a centerline parallel to a direction of movement, and each of the first, and second, and third conveyor centerlines can be aligned. A first transfer device operatively coupled to the first conveyor can divert at least a portion of the conveyed rolled absorbent products moving in a direction parallel to the centerline of the first conveyor to a fourth conveyor for moving rolled absorbent products in a direction substantially orthogonal to the centerline of the first conveyor. An un-diverted portion of the conveyed rolled absorbent products can be conveyed to the second conveyor. A second transfer device operatively coupled to the fourth conveyor can divert conveyed rolled absorbent products from the fourth conveyor to the third conveyor. In operation rolled absorbent products can be conveyed in a generally straight path from the first conveyor to the third conveyor via the second conveyor, or in a path that diverts away from the first conveyor and returns to the third conveyor via the fourth conveyor.

In an embodiment, the invention is a conveying system for conveying rolled absorbent products, including a conveyor for moving rolled absorbent products. The rolled absorbent products can be either partially wrapped or naked, the naked rolls being conveyed in streaming, side-by-side relationship in one or more lanes. The conveyor can have a centerline parallel to a direction of movement. A transfer device can be operatively coupled to the conveyor, the transfer device capable of diverting at least a portion of the partially wrapped rolled absorbent products in a direction substantially orthogonal to the centerline of the conveyor to a subsequent unit operation, which can be a sealing operation. An un-diverted portion of the conveyed rolled absorbent products, including at least a portion of the naked rolls, can be conveyed parallel to the centerline of the conveyor. In operation rolled absorbent products can be conveyed in a generally straight path parallel to the centerline of the conveyor and past the transfer device, or in a path that at the transfer device can be diverted away from the conveyor to the subsequent unit operation.

The conveyor shown in FIG. 3 can be any of first, second, third, or fourth conveyors, with a direction of MD flow as shown by arrow 3. The conveyor can be a roller conveyor, which can include driven rolls, or can be a gravity feed conveyor. The conveyor can be a belt conveyor utilizing an endless belt moving about a pair of end rollers. A plurality of rolled absorbent products 12 can be conveyed in one or more lanes 16, the lanes being arranged adjacent to one another across the width of the conveyor, that is, in the cross machine direction CD. In an embodiment, each lane of rolled absorbent product is separated from adjacent lanes by a lane separator 18, as is known in the art. In an embodiment, as shown in FIG. 3, three lanes of rolled absorbent products can be transported to wrapping station 4 for wrapping. Depending on the desired configuration for a package of wrapped rolled absorbent products one or more groups of adjacent rolled absorbent products can be included in each wrapped package of rolled absorbent products.

In an embodiment, as shown with reference again to FIG. 2, rolled absorbent products can be conveyed on first conveyor 10 in a direction shown by arrow 10a. The rolled absorbent products being conveyed on first conveyor 10 can be naked rolls or they can be wrapped rolls, including a plurality of naked rolls in a polymer over wrap. In an embodiment, for example, rolled absorbent products on first conveyor 10 can have passed through a wrapping station (not shown) in which one or more naked rolls are wrapped in a flexible polymer wrapping which can be described generally as a lap sealed tubular wrapping with open ends, as is known in the art. If the rolled absorbent products on first conveyor 10 are wrapped, the wrapped, rolled absorbent products can be diverted at first transfer device 100 in a direction away from first conveyor 10, and which can be generally orthogonal to the direction of first conveyor 10. Transfer device 100 is designed to operate in conjunction with first conveyor 10 and second conveyor 20 to optionally permit rolled absorbent product to be conveyed directly along centerline 32 to second conveyor 20, or to be diverted from first conveyor 10 to fourth conveyor 40. For example, as shown in FIG. 2, wrapped, rolled absorbent products can be diverted onto fourth conveyor 40 to follow a direction as indicated by arrow 40a, which aligns with the machine direction MD of conveyor 40. As shown in FIG. 2, fourth conveyor 40 conveys product away from first conveyor 10 at generally a 90° angle, that is, generally orthogonal to first conveyor 10. However, in general, fourth conveyor 40 can convey products at other angles other than a 90° angle.

Transfer device 100 can include any of a variety of apparatus and methods for diverting rolled absorbent products from first conveyor 10 to fourth conveyor 40. In one embodiment of the present invention transfer device 100 diverts rolled absorbent products in a manner such that the longitudinal axes 14 of the rolled absorbent products change direction but not orientation. That is, for example, rolled absorbent products on conveyor 10 can be oriented such that the longitudinal axis 14 of each is generally parallel and aligned with centerline 32 of first conveyor 10, as shown in FIG. 3. After transfer to fourth conveyor 40 by transfer device 100, the longitudinal axes 14 of the rolled absorbent products remain generally parallel to centerline 32 of first conveyor 10 and generally perpendicular to centerline 42 of fourth conveyor 40. In this manner, as can be understood by the description herein, the open ends of a conveyed, wrapped package are position for folding and sealing in a sealing device, as is known in the art. Therefore, in the embodiments disclosed below for first transfer device 100, the transfer from first conveyor 10 to fourth conveyor 40 can involve a change of direction for rolled absorbent products 12, but not a change in orientation relative to centerline 32 of system 1.

Figure 4:
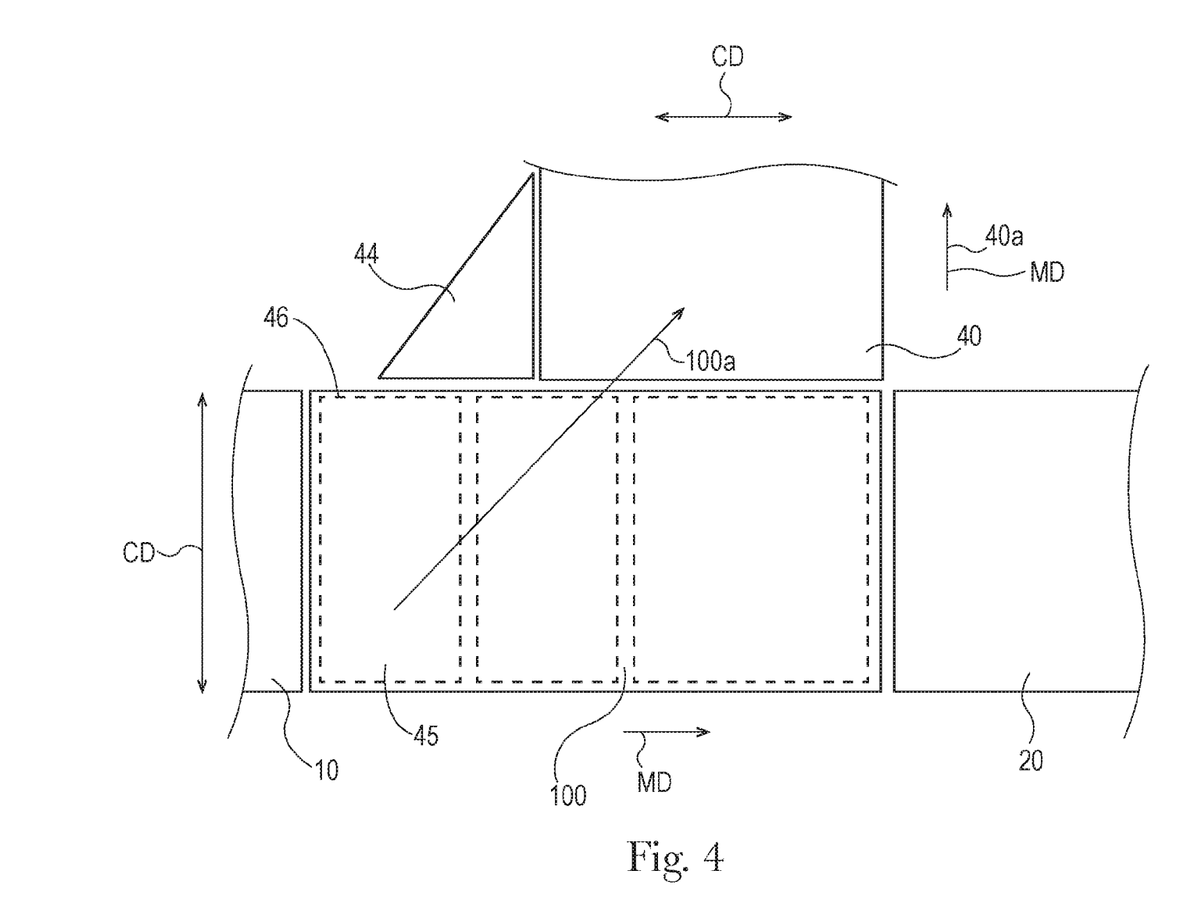
FIG. 4 is a plan schematic view of one embodiment of a transfer device of the present invention.

Referring back again to FIG. 2, first transfer device 100 can utilize Active Roller Belt® (ARB) technology, marketed by Intralox LLC (www.intralox.com). An ARB process is shown schematically in FIG. 4, and employs conveyors with embedded rollers on the conveyor surface which can be driven such that a cross-conveyor vector is produced to direct rolled absorbent products in the direction of the cross conveyor vector, such as the direction indicated by arrow 100a in FIG. 4. If necessary, a supplementary corner support 44 can be utilized in the inside corner between first conveyor 10 and fourth conveyor 40. Corner support 44 can be a smooth flat surface, but also can have rollers, belts, or other conveyor devices appropriately configured to facilitate movement of a package diagonally with respect to first conveyor 10 and fourth conveyor 40. Embedded rollers can be situated at a 90-degree angle to the MD direction of first conveyor 10 and driven at the same speed as first conveyor 10 to provide a nominally 45-degree divert angle to fourth conveyor 40. Different speeds and/or angles can provide a different divert angles. Transfer device 100 utilizing active roller belt technology can have a plurality of zones, indicated by the regions 45 enclosed by dashed lines 46 in FIG. 4. Zones 45 represent regions of transfer device 100 where the embedded rollers can be independently driven. When a wrapped (but not necessarily sealed) pack of rolled absorbent products is at least partially in a given zone or zones, that zone can be "turned on" (i.e. activated such that embedded rollers are started) to divert the pack in a predetermined direction. Once that angular travel is achieved, angled transition belts (not shown) can carry the pack to fourth conveyor 40 that can be situated at a 90-degree angle to the first conveyor 10. The embedded roller zones can be "turned on" until the pack is at the desired location on fourth conveyor 40 at which time the zones can be "turned off" (i.e. embedded rollers stopped) and the pack of rolled absorbent products travels solely on, in the direction of, fourth conveyor 40.

Figure 5:
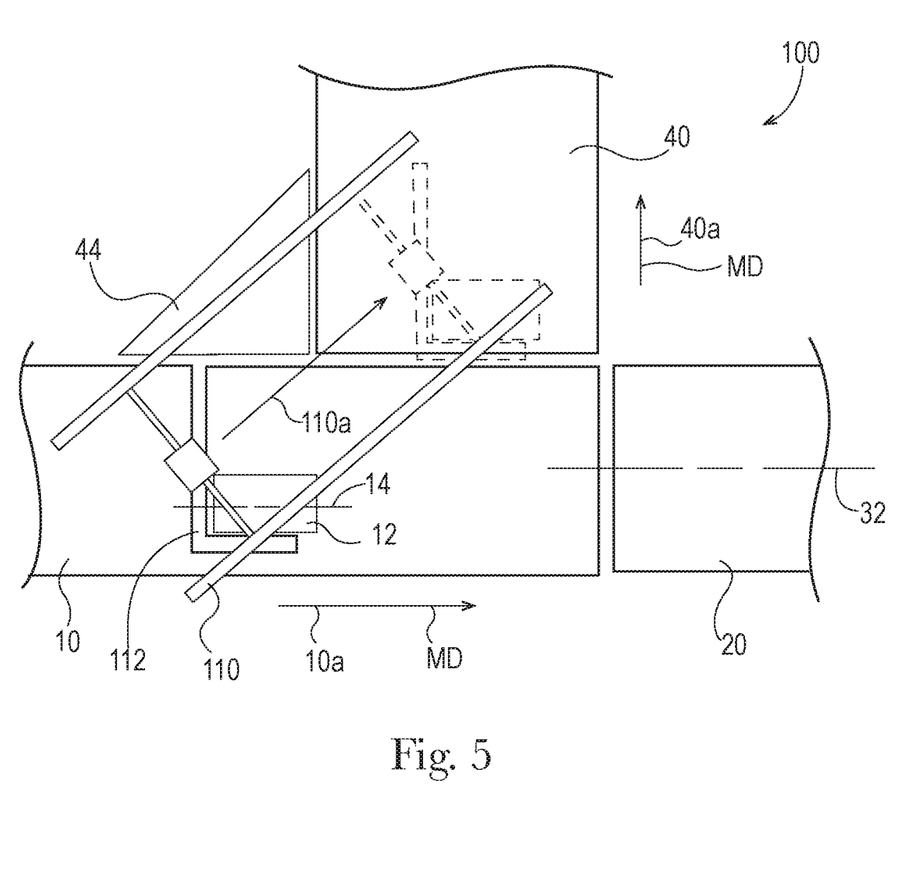
FIG. 5 is a plan schematic view of one embodiment of a transfer device of the present invention.

Another transfer device suitable for use as first transfer device 100 is shown schematically in FIG. 5. The transfer device 100 shown in FIG. 5 utilizes an overhead flighted mechanism 110 to transfer rolled absorbent products from first conveyor 10 to fourth conveyor 40, again, without changing the axial orientation of individual rolled absorbent products 12. In this configuration flights 112 engage a pack of rolled absorbent products on first conveyor 10 and move it in a direction indicated by arrow 110a to transport by pushing the rolled absorbent products at an angle, and releasing them once they are on fourth conveyor 40 and ready to be transported in new direction of flow 40a. The infeed conveyor, that is, first conveyor 10, is typically a belt conveyor with a surface that permits a package of rolled absorbent products to slide relatively easily when published by flights 112. The transport of a package of rolled absorbent products could occur across a belt conveyor or deadplate if necessary as product moves across a corner produced by the intersection of first conveyor 10 and forth conveyor 40. For example, if necessary, a supplementary corner support 44 can be utilized in the inside corner between first conveyor 10 and fourth conveyor 40. Corner support 44 can be a smooth flat surface, but also can have rollers, belts, or other conveyor devices appropriately configured to facilitate movement of a package diagonally with respect to first conveyor 10 and forth conveyor 40. The overhead flighted mechanism 110 can employ offset chains so that the flights 112 can maintain their X-Y orientation as they travel the return path. Overhead flighted mechanisms useful in the present invention are marketed and manufactured by Paper Converting Machine Company (PCMC, www.pcmc.com).

Figure 6:
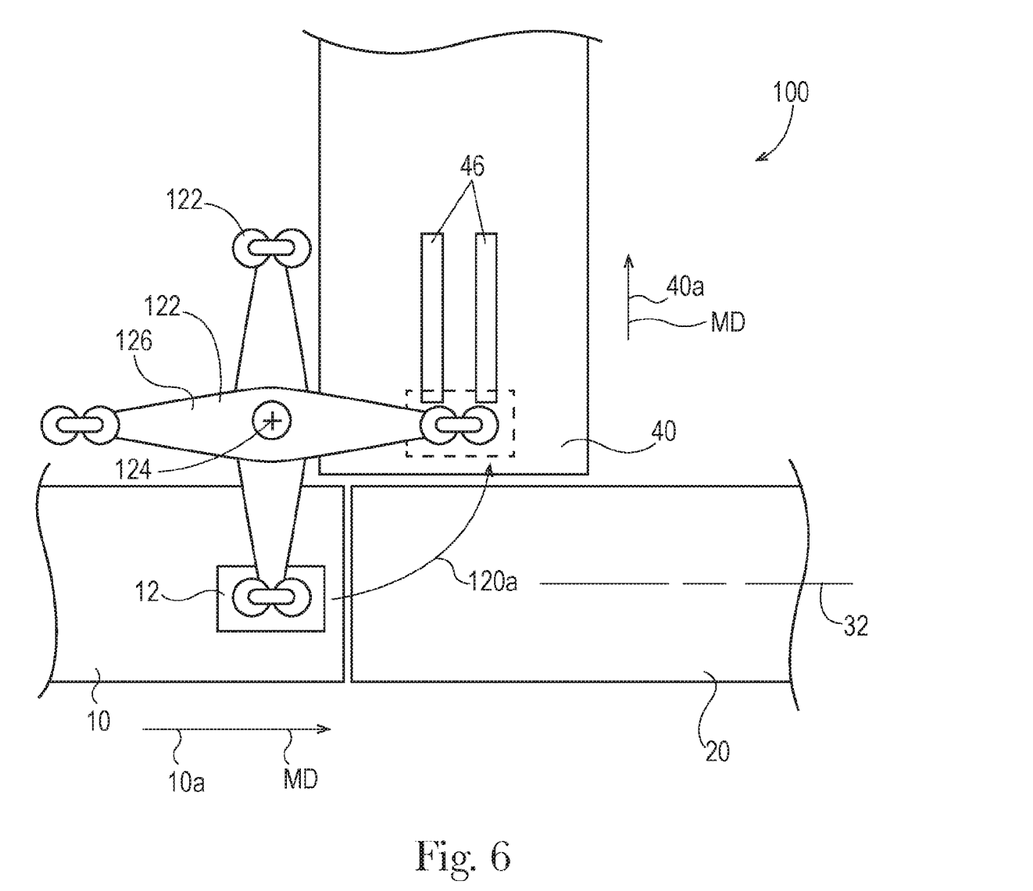
FIG. 6 is a plan schematic view of one embodiment of a transfer device of the present invention.

Another transfer device suitable for use as first transfer device 100 is shown schematically in FIG. 6. As shown in FIG. 6, a rotating device 120 rotates about an axis 124 above first conveyor 10 and fourth conveyor 40. Rotating device 120 includes a plurality of arms 126, each of which have attached on a distal end thereof package engagement devices 122. Rotating device 120 rotates in registration with packs of rolled absorbent products on first conveyor 10 such that package engagement devices 122 can engage a pack of rolled absorbent products as it reaches the end of first conveyor 10 and urge it to follow a path generally indicated as 120a in FIG. 6 until it rests on and can be conveyed by fourth conveyor 40. The circular motion followed by package engagement devices 122 serve to transfer packs from first conveyor 10 to fourth conveyor 40 in what can be considered the "ideal" path that minimizes the acceleration and deceleration forces on a pack of rolled absorbent products. First conveyor 10 and forth conveyor 40 can each be belt or flight conveyors, and the transfer could occur over a conveyor or deadplate (not shown) as described above with reference to the conveyors shown in FIGS. 4 and 5.

In an embodiment, package engagement devices 122 can be suction cups operating to engage the top of a package of rolled absorbent products. In such an embodiment, the suction need not lift the pack of rolled absorbent products completely, but rather need only secure it firmly enough to be able to slide it along a path from first conveyor 10 to fourth conveyor 40. The package engagement device 122 could also be a flight plate or other mechanical means for effectively engaging a package of rolled absorbent products. Whatever the package engagement device 122, it can employ a linkage to ensure that rolled absorbent products maintain their orientation with respect to centerline 32 along the circular path (so as to not rotate the pack with respect to centerline 32), as shown in FIG. 6. At the discharge to fourth conveyor 40, top belts 46 can be used to help secure the pack and maintain its orientation, as is known in the art. The example shown in FIG. 6 employs two arm mechanisms 126, but depending on the rate at which packages of rolled absorbent products are to be transferred, there could be more or less arms 126 and more or less package engagement devices 122 per transfer device 100.

Figure 7:
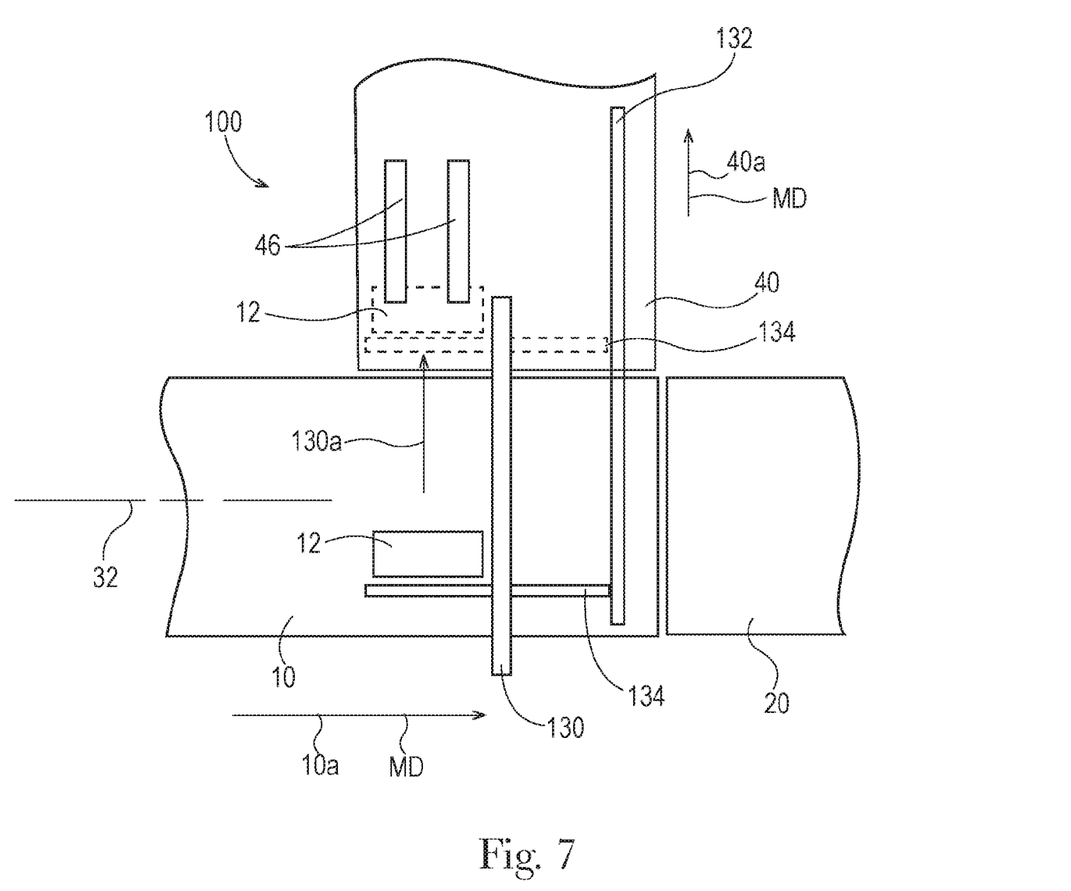
FIG. 7 is a plan schematic view of one embodiment of a transfer device of the present invention.

Another transfer device suitable for use as first transfer device 100 is shown schematically in FIG. 7. In the embodiment shown in FIG. 7, the transfer device 100 effects a 90-degree transfer of packages of rolled absorbent products by use of an overhead flight system designed to push rolled absorbent products orthogonally off of first conveyor 10. In this embodiment the package of rolled absorbent products can be stopped by a back stop 132 which can be raised and lowered between first conveyor 10 and second conveyor 20 for the purpose of stopping the movement of rolled absorbent products on first conveyor 10. Back stop 132 can be a rigid plate of steel or plastic and can be adjusted for different pack lengths and can serve to maintain or even correct the orientation of a package of rolled absorbent products. The back stop 132 can also be adjusted with respect to fourth conveyor 40 permit the delivery of the package of rolled absorbent products to fourth conveyor 40 in a centered or side justified fashion. Once stopped against back stop 132, a package of rolled absorbent products can be transferred to fourth conveyor 40 by an overhead flight system utilizing an overhead transfer mechanism 134 that translates in a linear fashion to push packages of rolled absorbent products from first conveyor 10 to fourth conveyor 40. At the discharge to fourth conveyor 40, top belts 46 could be used to help secure the pack and maintain its orientation, as is known in the art.

Figure 8:
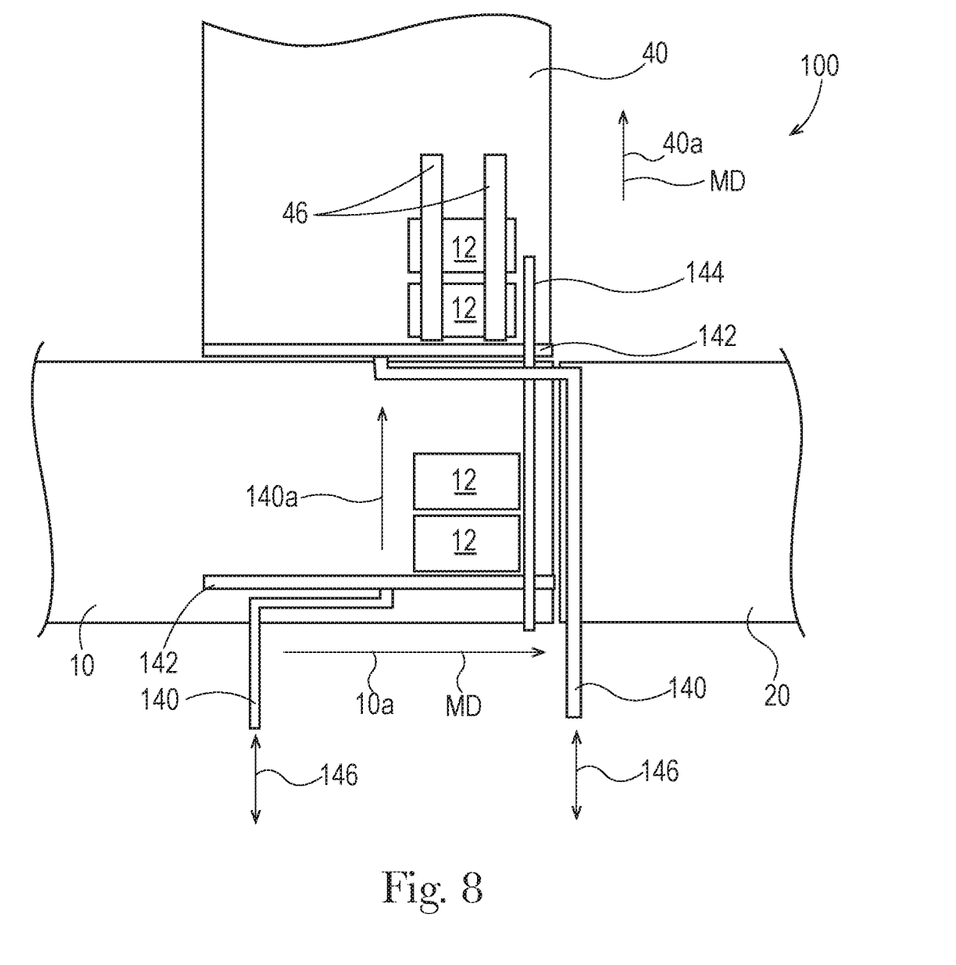
FIG. 8 is a plan schematic view of one embodiment of a transfer device of the present invention.
Figure 9:
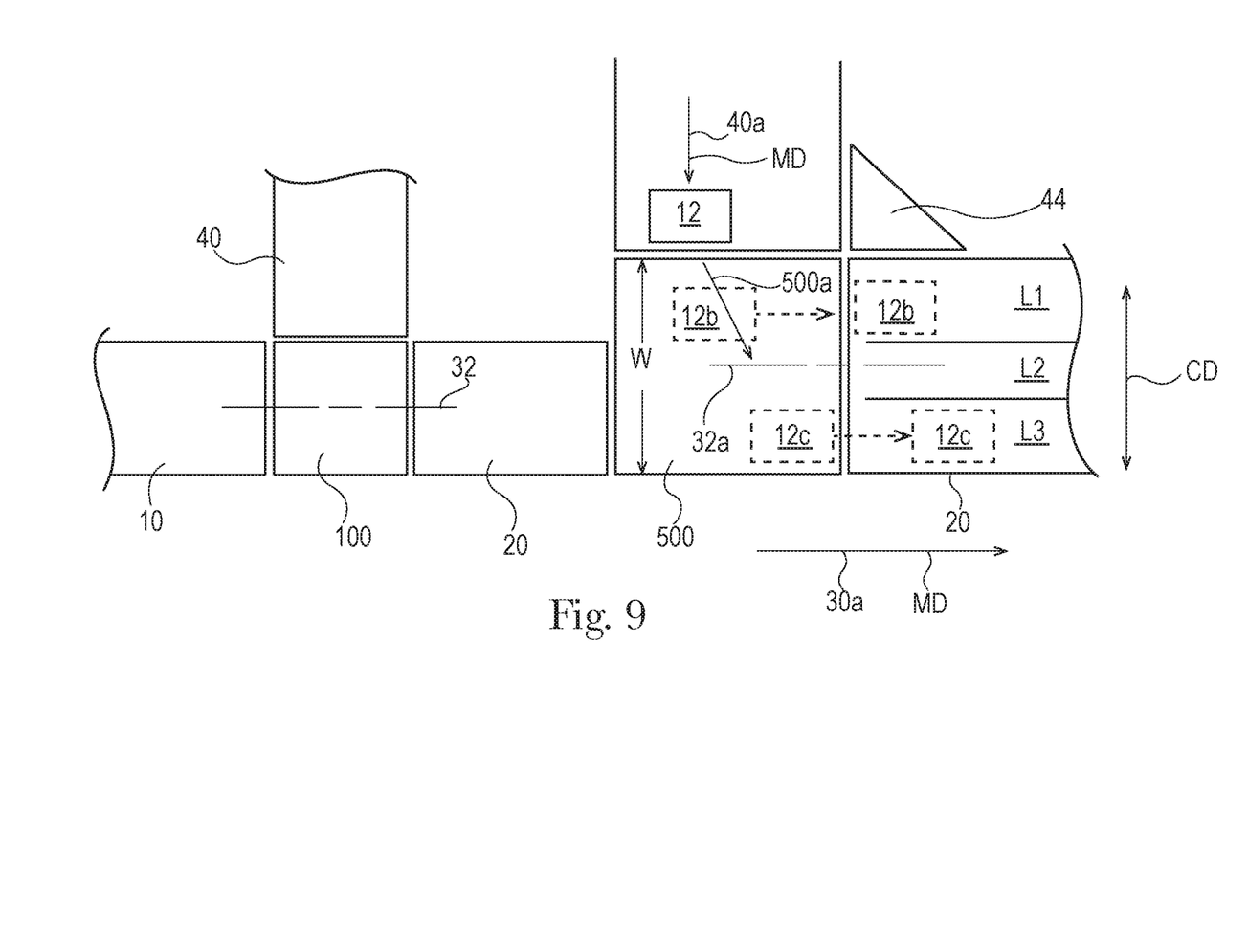
FIG. 9 is a plan schematic view of one embodiment of a transfer device of the present invention.

Another transfer device suitable for first transfer device 100 is shown schematically in FIG. 8. In the embodiment shown in FIG. 8, a transfer device 100 effects a 90° transfer by use of one or more robotic arms 140 which transfer packages of rolled absorbent products much like the flighted transfer shown and described with respect to FIG. 7, but with more flexibility relating to the rate of motion, as well as the path of motion. Robotic arms 140 can have package engagement portions 142 which can be simple pushing devices or can have positive package engagement mechanisms, such as suction cups. The robotic arms 140 can reciprocate linearly, each raising and lowering as necessary to avoid interference one with another, to push packages which have been stopped against back stop 144 from first conveyor 10 to fourth conveyor 40. Again, a back stop 144 can be a rigid plate of steel or plastic and can be adjusted for different pack lengths and can allow delivery of the package of rolled absorbent products to fourth conveyor 40 in a centered or side-justified fashion. At the discharge to fourth conveyor 40, top belts 46 could be used to help secure the package of rolled absorbent products and maintain its orientation. The robot (or robots) can be standard OEM models or custom designed, as is known in the art.

Again referring to FIG. 2, rolled absorbent products that have been wrapped and are conveyed on first conveyor 10 can be diverted by first transfer device 100 to be conveyed away from first conveyor 10 on to fourth conveyor 40. Fourth conveyor 40 can be a single, continuous conveyor curved such that it moves product away from first conveyor 10 but moves product toward third conveyor 30. For example, fourth conveyor 40 could be a U-shaped conveyor essentially of one continuous conveying path. However, fourth conveyor can include separate conveyor units as disclosed with reference to FIG. 2. For example, as shown in FIG. 2, rolled absorbent product can be moved from first conveyor 10 to fourth conveyor 40, specifically to outbound conveyor section 62. Fourth conveyor 40 can also include an inbound conveyor segment 64 that conveys rolled absorbent product toward third conveyor 30. A return segment 66 of fourth conveyor 40 transfers rolled absorbent product from outbound segment 62 to inbound segment 64.

At one of the segments of fourth conveyor 40 there can be a sealing station where the open ends of the polymer material of the wrapped, rolled absorbent products can be closed and sealed. For example, as shown in FIG. 2, a sealing station 70 can be operationally positioned on outbound segment 62 of fourth conveyor 60 for By "operationally positioned" is meant the sealing station can be positioned with respect to outbound segment 62 of fourth conveyor 40 such that it is properly positioned with respect to conveyor 40 to receive the package, fold in the open ends of the wrapper, and seal the wrapper closed, including by any means known in the art for designing, setting up, and working sealing stations for wrapped products.

Once closed and sealed, the sealed package of rolled absorbent products can be conveyed via return segment 66 to inbound segment 64 of fourth conveyor 40 such that the wrapped and sealed rolled absorbent products can be diverted at second transfer device 500 onto third conveyor 30 to be conveyed in the direction indicated by arrow 30*a* for final bundling or case packing, as is known in the art, for shipping to retail customers.

Like first transfer device 100, second transfer device 500 can be designed to optionally permit rolled absorbent product to be conveyed in a generally orthogonal, L-shaped path from inbound leg 64 of fourth conveyor 40 onto third conveyor 30, or to be conveyed straight from second conveyor 20 generally parallel and along centerline 32 to third conveyor 30.

Second transfer device 500 can be any of the transfer devices as described for transfer device 100, including devices utilizing active roller belt technology and flighted mechanisms for positively pushing wrapped packages of rolled absorbent products onto third conveyor 30. For example, FIG. 10 shows a schematic representation of a transfer device 500 utilizing Active Roller Belt® (ARB) technology technology, available from Intralox LLC. As with the transfer device 100 described above with reference to FIG. 4, ARB technology employs conveyors with embedded rollers on the conveyor surface which can be driven such that a cross-conveyor vector is produced to direct rolled absorbent products in the direction of the cross conveyor vector, such as the direction indicated by arrow 500*a* in FIG. 10.

As with first transfer device 100, second transfer device 500 can also utilize a flighted transfer, as shown in FIG. 11. Thus, second transfer device can use overhead flights, tracks, arms, and the like as is known in the art to push a package of rolled absorbent products onto third conveyor 30 without interfering with other conveyor operations, including, in some embodiments, with naked rolls of product being transported from second conveyor 20 to third conveyor 30.

One difference between transfer device 100 and transfer device 500 is the dimensions of a discharge area for discharging wrapped packages of absorbent product from fourth conveyor 40 to third conveyor 30. Because third conveyor 30 in a typical operation can convey packages for additional packaging operations, including case packing for shipping to retail customers, it can be beneficial to have the wrapped absorbent products discharged from fourth conveyor 40 to be discharged in multiple width-wise (e.g., CD-oriented) lanes, such that the discharged packs are conveyed downstream at predetermined, varying distances from centerline 32 and can thus be fed to additional operations such as case packing in a width-wise distribution.

As can be understood from the description of the invention as described herein, and further with respect again to FIG. 2, the method and system for conveying rolled absorbent products of the present invention has several advantages. First, the L shaped configuration of known wrapping and sealing conveying operations is eliminated. Second, the method and system of the present invention is less disruptive to conveying naked rolls to case packing operations. That is naked rolls, whether single, or multiple rolls, can be conveyed in a straight line from first conveyor 10 to second conveyor 22 third conveyor 30, thereby experiencing no change in direction, which results in less opportunity for disruption to configurations of naked roll products prior to being packed in cases for shipping to retail customers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A conveying system for conveying rolled absorbent products, the system comprising:
   a. a plurality of rolled absorbent products, said rolled absorbent products comprising a cardboard tube core, said rolled absorbent products also comprising a longitudinal axis being the center of the cardboard tube core;
   b. a conveyor for moving said rolled absorbent products, said rolled absorbent products being either partially wrapped or naked, said naked rolls being conveyed in streaming, laying down, side-by-side relationship in one or more lanes, so that the cardboard tube core is generally parallel to the conveyor, said conveyor having a centerline parallel to a direction of movement;
   c. a transfer device operatively coupled to said conveyor, said transfer device capable of diverting at least a portion of said partially wrapped rolled absorbent products in a direction substantially orthogonal to said centerline of said conveyor to a subsequent unit operation such that the longitudinal axes of the diverted partially wrapped rolled absorbent products are orthogonal to the centerline of the conveyor, or alternatively of maintaining an un-diverted portion of said conveyed rolled absorbent products, including at least a portion of said naked rolls, conveyed parallel to said centerline of said conveyor such that the longitudinal axes of the un-diverted rolled absorbent products are parallel to the centerline of the conveyor; and,
   d. wherein in operation rolled absorbent products can be conveyed in a generally straight path parallel to said centerline of said conveyor, or in a path that diverts away from said conveyor to said subsequent unit operation;
   e. wherein said conveyor comprises a wrapping station, said wrapping station being capable of wrapping one or more rolled absorbent products prior to said subsequent unit operation, and f. wherein said subsequent unit operation comprises a sealing station for sealing said partially wrapped rolled absorbent products.

2. The conveying system of claim 1, wherein said transfer device comprises at least one embedded roller conveyor.

3. The conveying system of claim 1, wherein said rolled absorbent products comprise paper towels.

4. The conveying system of claim 1, wherein said rolled absorbent products comprise bath tissue.

\* \* \* \* \*